United States Patent [19]

Klatt

[11] Patent Number: 4,873,442
[45] Date of Patent: Oct. 10, 1989

[54] METHOD AND APPARATUS FOR SCANNING THERMAL IMAGES

[75] Inventor: Robert W. Klatt, Rancho Palos Verdes, Calif.

[73] Assignee: Hughes Aircraft Company, Los Angeles, Calif.

[21] Appl. No.: 806,895

[22] Filed: Dec. 9, 1985

[51] Int. Cl.4 ............................................. H01J 31/50
[52] U.S. Cl. ................................... 250/334; 250/332; 250/330
[58] Field of Search ............ 250/334, 332, 330, 370 G

[56] References Cited

U.S. PATENT DOCUMENTS

| | | | |
|---|---|---|---|
| 3,941,923 | 5/1976 | Wheeler | 250/330 |
| 4,222,065 | 9/1980 | Pusch | 250/334 |
| 4,403,148 | 9/1983 | Coon et al. | 250/332 |
| 4,580,051 | 4/1986 | Tew | 250/332 |

Primary Examiner—Janice A. Howell
Assistant Examiner—Richard Hanig
Attorney, Agent, or Firm—Ronald L. Taylor; W. J. Streeter; A. W. Karambelas

[57] ABSTRACT

An imaging sensor for scanning an image in an object space is disclosed. The imaging sensor comprises a first and second plurality of infrared detectors. Also provided is a reflecting means for reflecting a predetermined portion of the object space on the first plurality of infrared detectors during first portion of the scanning cycle. The reflecting means is further able to reflect the predetermined portion of the object space on the second plurality of infrared detectors during the second portion of the scanning cycle. In a further embodiment, the orientation of the detectors permits each of the detectors to be calibrated with respect to another of the detectors by a sequential comparison of the outputs of pairs of the detectors whose fields-of-view overlap.

20 Claims, 4 Drawing Sheets

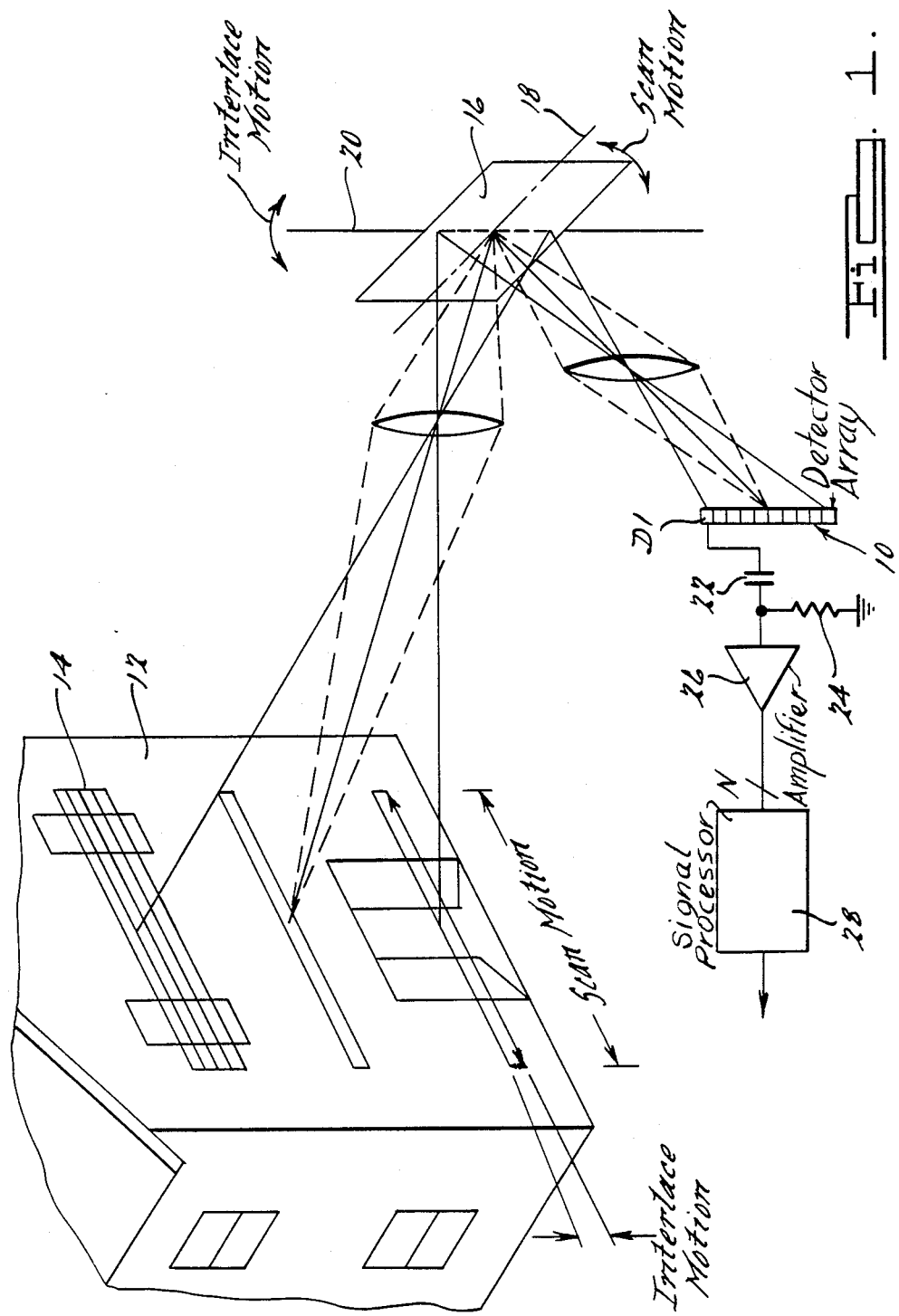

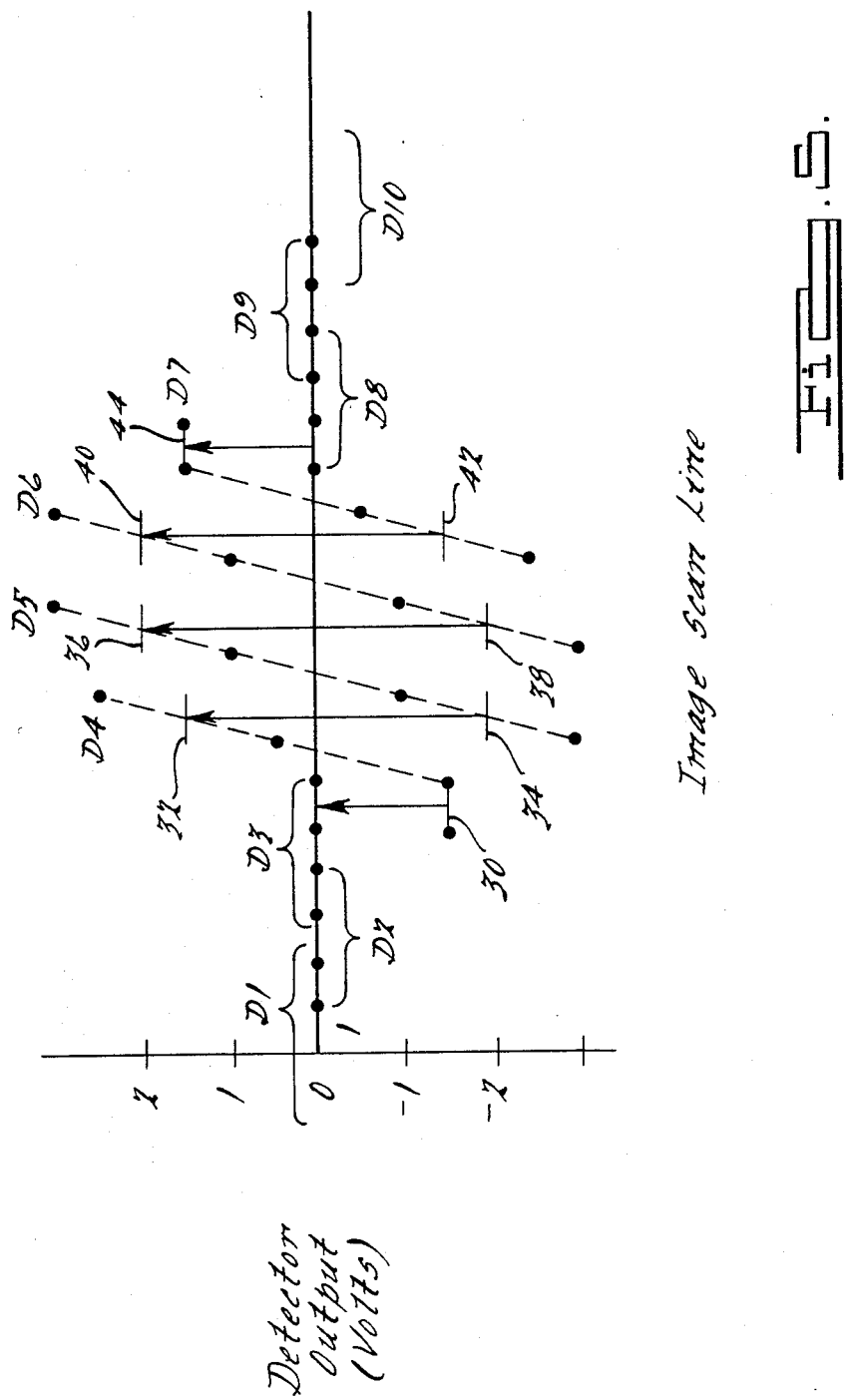

METHOD AND APPARATUS FOR SCANNING THERMAL IMAGES

BACKGROUND OF THE INVENTION

1. Field of the Invention

This invention relates to the field of infrared sensing, and more particularly, to a method and apparatus for scanning thermal images.

2. Description of Related Art

Elemental infrared detectors are often used in conjunction with missiles and night vision systems to sense the presence of electromagnetic radiation having a wavelength of 1–15 $\mu$m. These detectors often operate on the principle of photoconductivity, in which infrared radiation changes the electrical conductivity of the material upon which the radiation is incident. Such detectors are often fabricated from mercury-cadmium-telluride, though other materials such as CdTe and CdSe are also used.

While an array of elemental infrared detectors may be used in an elemental system in which the detectors sense the average energy generated by an object space, they may also be used in thermal imaging systems. In one such imaging system using a charge coupled device ("CCD"), the elemental detectors produce free charge carriers which are then injected into the CCD structure and are processed by using time delay integration and parallel-to-serial scan conversion. In real time thermal imaging systems such as forward looking infrared ("FLIR") imaging sensors, moving mirrors are used to scan radiation emitted by the object space across an array of elemental detectors, the temporal outputs of which are a two-dimensional representation of the thermal emission from the object space.

The optical system of an imaging sensor projects a real image of the scene (or object space) upon the plane (usually referred to as the focal plane) containing the detector array sensitive surface. The array may be two dimensional, with the corner elements viewing the corners of the desired image or sensor field-of-view ("FOV"). The array may be essentially one dimensional (usually referred to as a linear array, perhaps with multiple rows) where the end elements define two edges of the FOV but the narrow dimension of the array is much smaller than the other image dimension and the image must be moved (or scanned) in a direction normal to the long dimension of the array in order for the linear array to cover the desired FOV. The array may also be essentially a point in the sense that both dimensions of the detective array are much smaller than the desired image or FOV, and the image must be scanned in two directions across the detector in order for the detector to cover the desired FOV. The relative movement of a linear array from one edge of the FOV to the opposite edge, or of a point detector from one corner of the FOV to the opposite corner, generates a field of image information. The two dimensional detective array, used in what is referred to as a "staring sensor", generates a field of information without relative motion between the detective array and image. In all three cases, the individual elements of the detective array will have non-zero area and dimensions, and the detective array will cover some part of the total image area during each field.

In general, there will be some space between individual elements, the area swept out by the detector elements in one field will be less than the total area of the image, and some image information may be lost. For this reason many sensors operate in the interlace mode. Consider, for example, a linear array with adjacent detector elements separated by spaces equal to the detector height, where height is the dimension parallel to the long dimension of the array. In one field this array would cover or sweep out one-half the image area. In the interlace mode of operation, the image would be shifted one element height in the direction parallel to the array length and a second field generated. The combination of two fields, which together cover the desired image, is generally called a frame. The same approach may also be needed by and applied to two dimensional arrays (staring sensors) and point arrays (used in what are generally referred to as serial scanners). In the example given, the interlace ratio is 2:1 since it takes two fields to generate one complete image (or frame). Interlaced operation is also used to reduce signal band width.

When each field covers exactly half the image, there is no overlapping of fields, and the sensor is said to have zero overscan (usually given as a percentage). Some overscan may be desireable. Returning to the previous example of 2:1 interlace, increasing the detector height while keeping everything else constant allows the fields to overlap. The increased detector size produces increased spatial filtering. As another example, keeping the detector geometry constant but doubling the interlace ratio produces 100% overscan and can reduce image artifacts due to aliasing. In both these cases, the centers of different detective elements do not sample the same image point (for a staring sensor) or image line (for a linear array).

When used in conjunction with certain imaging systems, the output from each elemental detector is often coupled to the amplifying electronics through an A.C.-coupling circuit. Such A.C.-coupling circuits generally provide three advantages when used in imaging systems. The first of these advantages is that good contrast rendition of the object space requires background subtraction, which can generally be approximated by using an A.C.-coupling circuit. Secondly, the D.C. biasing potential supplied to an elemental detector can be removed by the coupling circuit so that the biasing potential will not influence the subsequent processing of the detector output. Finally, an A.C.-coupling circuit is able to minimize the effects of detector 1/f noise on the processing electronics.

Because the implementation of the A.C.-coupling circuit often requires an RC high-pass network, the circuit will generate a zero output voltage when a D.C. signal representing the average thermal intensity of the object space is produced by the elemental detectors. While the elemental detectors could therefore sense variations in thermal intensity of the object space, the average intensity could not be determined without some means for restoring the D.C. portion of the detector output.

To restore this D.C. portion of the detector output after the output had passed through an A.C.-coupling circuit, the imaging sensor was often designed to scan a thermal reference source during an inactive portion of the scan cycle. The thermal reference source would often comprise a passive source such as a field stop or an active source such as a heated strip. When the thermal emission from the thermal reference source was received by a detector, the last coupling capacitor output was shorted to ground. By shorting the coupling capacitor in this manner, the capacitor would rapidly charge to a D.C. value equal to the signal produced by the detector upon receipt of the thermal emission of the thermal reference source. When the detector reached the active portion of the scan cycle, the circuit resumed normal operation allowing passage of the signal variation around the thermal reference signal voltage.

In addition, to compensate for differences in responsivities (i.e., the rms signal voltage generated by a detector per unit rms radiant power incident upon the detector) between the detector channels (i.e., the detector together with its coupling and amplifying electronics), it was often necessary to use a second thermal reference source. At different times during the inactive portion of the scan cycle, each elemental detector would receive thermal emissions from each of the thermal reference sources. Because the thermal reference sources emitted different intensities of infrared radiation, the responsivities of the detectors could be measured by comparing the output of each detector when receiving radiation from each of the sources. The output signal from each of the detectors could then be adjusted to compensate for the variation in the responsivities among the various detectors.

While the methods for providing D.C. restoration and responsivity equalization described above were somewhat effective, they required an imaging sensor to scan at least one thermal reference source during the inactive portion of its scan cycle. The imaging sensor therefore often had to be used in conjunction with relatively complex opto-mechanical mechanisms. Additional complications also existed with respect to maintaining the temperature of the thermal reference sources within the required operating limits.

SUMMARY OF THE INVENTION

According to the preferred embodiment of the present invention, an imaging sensor is disclosed for scanning an image in an object space. The imaging sensor comprises a first and second plurality of infrared detectors. A reflecting means is provided to reflect a predetermined portion of the object space on the first plurality of infrared detectors during a first portion of the scanning cycle. The reflector means is further able to reflect the predetermined portion of the object space on the second plurality of infrared detectors during the second portion of the scanning cycle. In a further embodiment, the orientation of the detectors permits each of the detectors to be calibrated with respect to another of the detectors by a sequential comparison of the outputs of pairs of the detectors whose fields-of-view overlap.

BRIEF DESCRIPTION OF THE DRAWINGS

Various advantages of the present invention will become apparent to one skilled in the art upon reading the following specification and reference to the following drawings in which:

FIG. 1 is a diagrammatic illustration of the operation of an imaging sensor.

FIG. 2 illustrates the scanning pattern of the elemental detectors of an imaging sensor according to the method of the present invention;

DESCRIPTION OF THE PREFERRED EMBODIMENT

Figure 5:
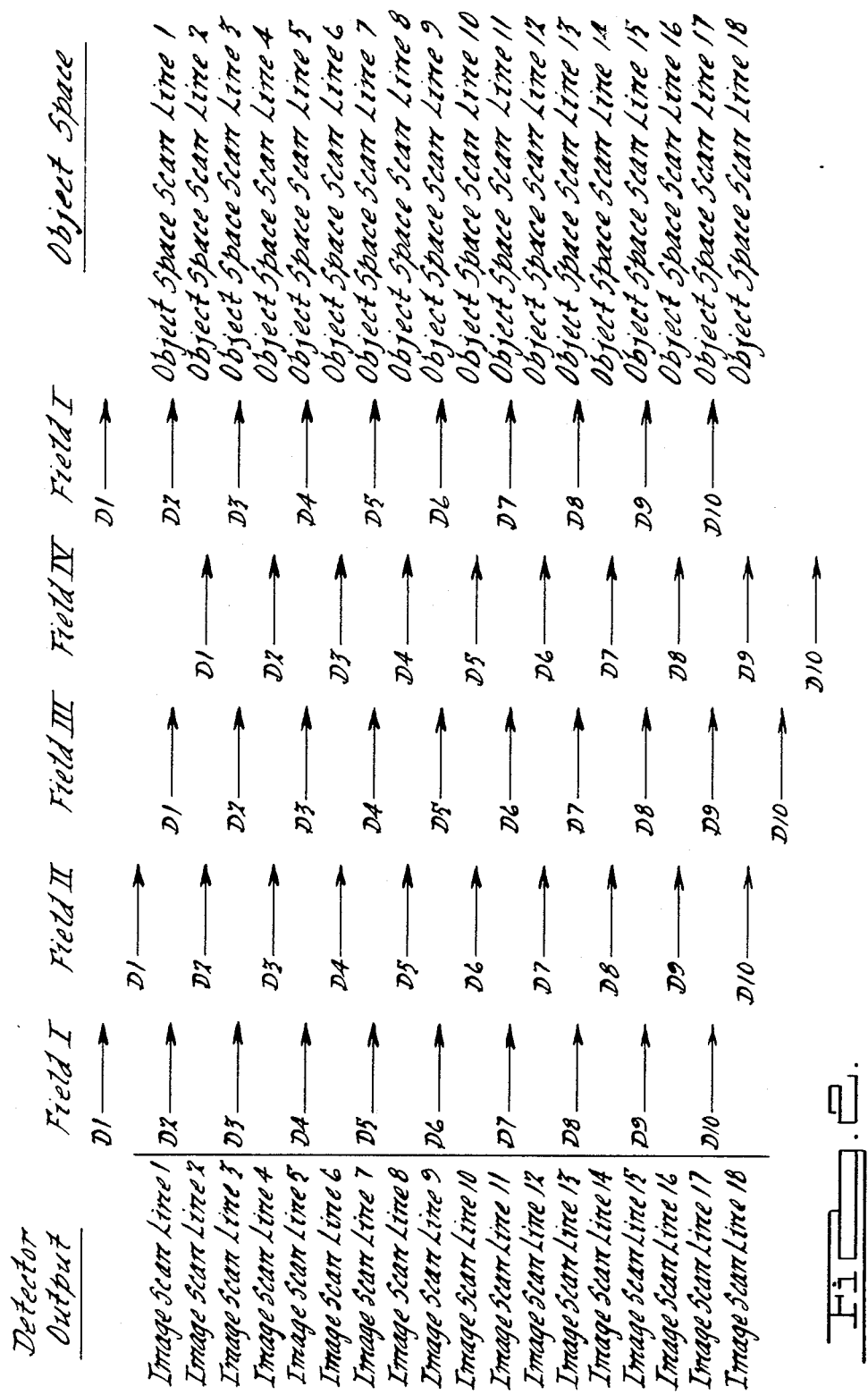
FIG. 5 illustrates the A.C.-coupled output signals of the elemental detectors of an imaging sensor when scanning the object space shown in FIG. 3 using the method according to the present invention.

Referring to FIG. 1, a detector array 10 is provided to detect a thermal image in the field-of-view of the array 10. The thermal image may be generated by the different intensities of thermal radiation emitted by a source 12 in the object space which is within the field-of-view of array 10. The detector array 10 comprises a plurality of elemental detectors each able to scan a portion of the source 12 which lies within its field-of-view. For purposes of illustration, the detector D1 is able to scan a field-of-view 14. The field-of-view 14 includes four object space scan lines each corresponding to one of four fields which the array 10 uses to scan the source 12 as discussed subsequently. To deliver the thermal image to the detector array 10, a scan mirror 16 is provided. The scan mirror 16 receives infrared radiation from the source 12 and directs the thermal image to the detector array 10. The scan mirror 16 is able to move about a scan axis 18 to allow the detector array 10 to horizontally scan the source 12, and is able to rotate about an interlace axis 20 to allow vertical interlace scanning.

To process signals received from the source 12, the output from each detector to the array 10 connected to A.C.-coupling circuit. For purposes of illustration, the AC-coupling circuit for only the detector D1 is shown and includes a coupling capacitor 22 and a resistor 24. The capacitor 22 and the resistor 24 are used to remove the D.C. bias potential supplied to the detectors forming the array 10. The output of the capacitor 22 is coupled to an amplifier 26 which is in turn coupled to a signal processor 28. The output of the processor 28 is used to evaluate the thermal image received by the array 10.

The method of scanning used with the detector array 10 can best be described by reference to FIG. 2. To detect a thermal image in an object space, a plurality of elemental detectors is provided. The detectors D1–D10 may be part of a forward looking infrared imaging sensor, though they may also be part of another suitble imaging system. For purposes of illustration, the object space viewed by the detectors D1–D10 is scanned in four fields: FIELD I, FIELD II, FIELD III and FIELD IV. Each field is divided into a series of object space scan lines 1–18 which are viewed by the detectors D1–D10 in the manner described subsequently. The output from the detectors D1–D10 form image scan lines 1–18 which are electrical representations corresponding to the object space scan lines 1–18. It is to be understood however that the object space may be scanned in a greater or smaller number of fields, and the object space may comprise a larger or smaller number of scan lines.

To scan FIELD I, the detector D2 receives object space scan line 1 and generates image scan line 1. Also during the scanning of FIELD I, the detector D3 generates image scan line 3 upon receipt of object space scan line 3. Similarly, the detector D4 generates image scan line 5 upon receipt of object space scan line 5, and the detector D5 generates image scan line 7 in response to object space scan line 7. The detectors D6–D10 also produce image scan lines 9, 11, 13, 15 and 17 from object space scan lines 9, 11, 13, 15 and 17 respectively. While viewing FIELD I, the detector D1 does not receive infrared radiation from the object space which is useful in subsequent processing.

To scan FIELD II, the position of the elemental detectors D1–D10 is displaced with respect to the object space by approximately the distance between the edges of adjacent detectors. By providing such an interlace shift, the detector D2 is able to receive object space scan line 2 and generate image scan line 2. Similarly, the detectors D3–D10 are able to receive object space scan lines 4, 6, 8, 10, 12, 14, 16 and 18 and generate image scan lines 4, 6, 8, 10, 12, 14, 16 and 18. While viewing FIELD II, the detector D1 does not receive infrared radiation from the object space which is useful in subsequent processing. The interlace shift of the detectors D1–D10 with respect to the object space may be achieved by using horizontally and vertically rotating germanium prism mirrors oscillating in orthogonal directions, which typically may provide a displacement of 0.0002 inch. It is to be understood, however, that other scanning mechanisms which can provide a suitable interlace shift may be used.

To scan FIELD III, the position of the detectors D1–D10 is again shifted with respect to the object space in the manner described above. In this orientation, the detectors D1–D9 are able to receive object space scan lines 1, 3, 5, 7, 9, 11, 13, 15 and 17 and generate image scan lines 1, 3, 5, 7, 9, 11, 13, 15 and 17 respectively. While viewing FIELD III, the detector D10 does not receive infrared radiation from the object space which is used in subsequent processing. To scan FIELD IV, the orientation of the detectors D1–D10 is further shifted with respect to the object space. The detectors D1–D9 are therefore able to receive object space scan lines 2, 4, 6, 8, 10, 12, 14, 16 and 18 to generate image scan lines 2, 4, 6, 8, 10, 12, 14, 16 and 18 respectively. While viewing FIELD IV, the detector D10 does not receive infrared radiation from the object space which is useful in subsequent processing.

After viewing FIELD IV, the detectors D1–D10 are displaced with respect to the object space by approximately four times the distance between the edges of adjacent detectors, returning the orientation of the detectors D1–D10 to that which existed when the detectors D1–D10 viewed FIELD I. By displacing the detectors D1–D10 in this manner, the detectors D1–D10 are able to overlappingly scan the object space in a 4:1 vertical interlace pattern.

To allow responsivity equalization, the output of adjacent pairs of detector channels (i.e., the detector together with its coupling and amplifying electronics) are compared when each of the detectors view the same object space scan line. The output of the detector channel which includes the detector D2 in FIELD I, for example, is compared with the output in FIELD III of the detector channel which includes detector D3. Because both the detectors D1 and D2 view object space scan line 1 when their outputs are compared, the difference between the output of their respective detector channels may be attributed to the responsivities differences. By comparing the differences in the outputs of the detector channels which correspond to the detectors D1 and D2, their relative responsivities can be calculated and appropriate signal compensation used when their outputs are processed. In a similar fashion, the output in FIELD II from the detector channel which includes the detector D3 is compared with the output in FIELD IV of the detector channel which includes the detector D2. Because their outputs are compared when both the detectors D2 and D3 view object space scan line 4, the differences in the outputs of the detector channels due to their relative responsivities can be calculated so that appropriate signal compensation can be implemented. As the outputs of each of the remaining detector channels are compared in the manner described above, their outputs can be adjusted to provide the desired equalization.

Figure 3:
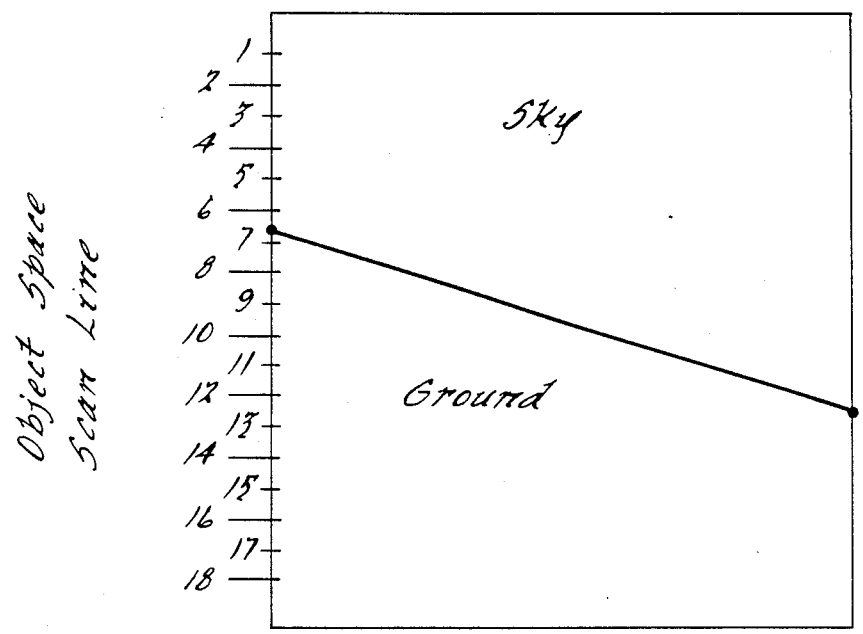
FIG. 3 illustrates a sample object space which may be scanned using the method of scanning according to the present invention.
Figure 4:
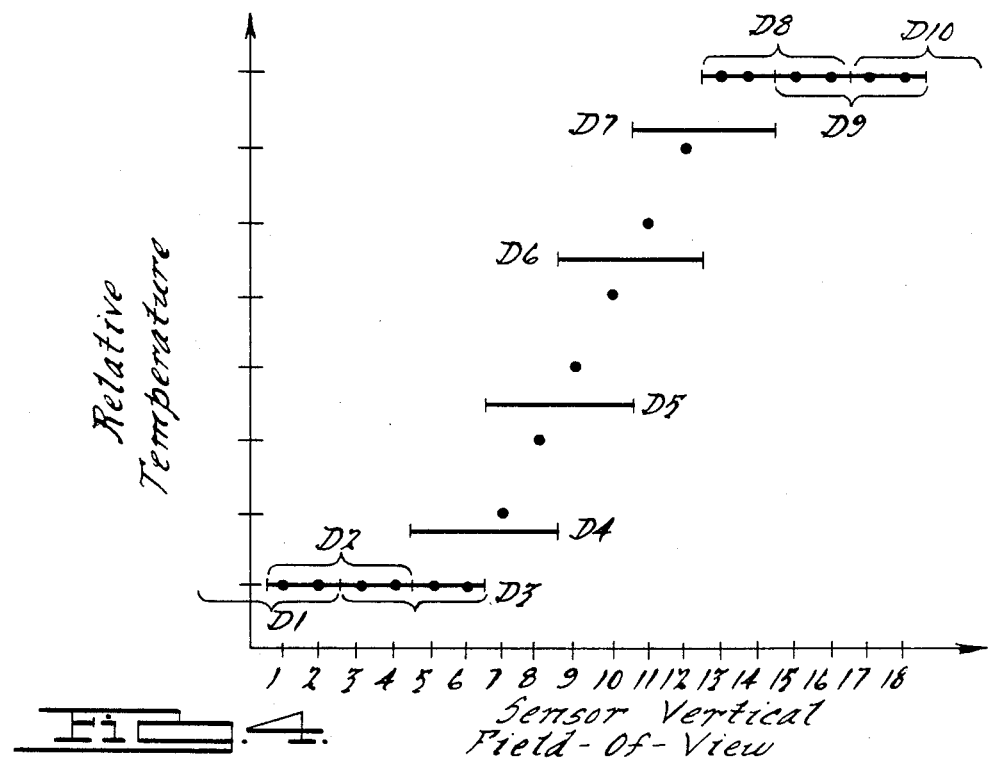
FIG. 4 illustrates the average temperature detected by the elemental detectors of an imaging sensor when scanning the sample object space shown in FIG. 3 according to the present invention.

To allow D.C. restoration of A.C.-coupled outputs from the detectors D1–D10, the image scan lines generated in overlapping fields are averaged after A.C.-coupling. When the pattern of FIG. 2 is used to scan the sample object space shown in FIG. 3, the detectors D1–D10 generate outputs indicative of the average thermal emission received when scanning FIELDS I-IV as shown in FIG. 4. It will be noted that each adjacent pair of detectors have individual fields of view which overlap by two object space scan lines. This output from the detectors D1–D10 is supplied to an A.C.-coupling circuit to produce the output shown in FIG. 5. The horizontal line segment 30 in FIG. 5 represents the average A.C.-coupled output from image scan lines 5 and 6 as generated by the detector D4. Similarly, the horizontal line segment 32 represents the average A.C.-coupled output from image scan lines 7 and 8 produced by the detector D4. With respect to detector D5, the horizontal line segment 34 represents the average A.C.-coupled output from image scan lines 7 and 8; while the horizontal line segment 36 represents the average A.C.-coupled output from image scan lines 9 and 10. The horizontal line segments 38, 40, 42 and 44 represent similar averages corresponding to the average A.C.-coupled outputs from detectors D6–D7. The average A.C.-coupled output for the detectors D1, D2, D3, D8, D9 and D10 are zero as indicated. Though the average outputs for pairs of image scan lines are shown in FIG. 5, the averages for individual image scan lines could also be used.

To reconstruct the D.C. signals from the detectors D1–D10 blocked by the A.C.-coupling circuit, the voltage difference between the horizontal line segments in FIG. 5, representing the average outputs of overlapping detector FOV's are calculated. These differences shown in FIG. 5 as the vertical arrows connecting the line segments representing common averages are then summed with the A.C.-coupled signal to produce a reconstructed output according to the following formula:

$$O_{(n)} = I_{(n)} + \sum_{1}^{n} \Delta_{(n,n-1)}$$

Where:
$O(n)$ = reconstructed output signal
$I(n)$ = A.C.-coupled signal
$\Delta_{(n,\,n\text{-}l)}$ = difference between the average outputs of two detectors measuring the same output scan line.

To illustrate the operation of the manner in which D.C. restoration is obtained using the present invention, a non-limiting example of the restoration technique will be presented. As is shown in FIG. 5, the value of $\Delta_{(2,1)}$ and $\Delta_{(3,2)}$ is zero as both the detectors D1, D2 and D3 sense the same intensity of infrared radiation (i.e., the sky shown in FIG. 3). The value of $\Delta_{(4,3)}$ is approximately 1.5 volts, while the value of $\Delta_{(5,4)}$ is 3.5 volts. To reconstruct the signal for the detector D4, the value of the summation term in the previous equation is equal to $\Delta_{(2,1)} + \Delta_{(3,2)} + \Delta_{(4,3)} + \Delta_{(5,4)} = +5$ volts. Therefore, the reconstructed output signal $O_{(5)}$ is equal to $I_{(5)} + 5$ volts. Reconstructed outputs for the remaining detectors can be similarly calculated.

It should be understood that the invention was described in connection with a particular example thereof. While the scanning pattern discussed above allows D.C. restoration as well as responsivity equalization of the detectors of a vertically interlaced imaging system, other scanning patterns may be used in which nonequivalent sets of detectors view the same region of the object space. The invention can be used in different applications which may employ other types of signal transducers, and may be used to calibrate transducers with respect to other types of electrical characteristics. Other modifications will become apparent to those skilled in the art after a study of the specification, drawings and following claims.

What is claimed is:

1. An imaging sensor for scanning an image in an object space during first and second portions of a scanning cycle, said imaging sensor comprising:

a plurality of infrared detector channels each comprising an infrared detector, each of said infrared detectors having an overlapping field-of-view with another of said infrared detectors; and means for reflecting said object space onto said infrared detectors, said means for reflecting said object space onto said infrared detectors operable to expose each of said infrared detectors to the field-of-view of at least one other of said infrared detectors to allow said infrared detectors to be calibrated by sequentially comparing the outputs of each of said elemental detectors with another of said elemental detectors having an overlapping fields-of-view.

2. The apparatus of claim 1, wherein said imaging sensor obtains responsivity equalization between said detector channels by sequentially compariing the outputs from those of said detector channels which have detectors with overlapping fields-of-view.

3. The apparatus of claim 1, wherein said imaging sensor obtains DC restoration of the outputs from said infrared detector channels by sequentially comparing the outputs from those of said detector channels which have detectors with overlapping fields-of-view.

4. The method of scanning an object space using at least first and second transducers, the output of said first and second transducers electrically communicating with an A.C.-coupling circuit, said method comprising the steps of:

scanning a predetermined portion of said object space by said first transducer to produce a first output;

scanning said predetermined portion of said object space by said second transducer to produce a second output; and obtaining D.C. restoration of said first and said second outputs after being processed by said A.C.-coupling circuit by a comparison of the values of said first and said second outputs.

5. The method of claim 4, wherein said transducers detect infrared radiation.

6. The method of claim 4, wherein said object space is scanned in at least first and second fields, said first transducer receiving signals from said predetermined portion of said object space when said first transducer is scanning said first field, said second transducer receiving signals from said predetermined portion of said object space when said second transducer is scanning said second field.

7. The method of claim 6, wherein said object space is divided into a plurality of object space scan lines, said predetermined portion of said object space including one of said object space scan lines.

8. The method of claim 4, wherein said method further comprises the additional step of sequentially displacing said transducers with respect to said object space to provide an overlapping scan of said object space.

9. The method of claim 8, wherein said step of sequentially displacing said transducers is operable to scan said object space in an interlace pattern.

10. The method of claim 9, wherein said step of sequentially displacing said transducers is further operable to produce a 4:1 interlace pattern.

11. A method of scanning an object space using at least first and second transducer channels having different responsivities, said method comprising the steps of:

scanning a predetermined portion of said object space by said first transducer channel to produce a first output;

scanning said predetermined portion of said object space by said second transducer channel to produce a second output; and obtaining compensation for the differences in responsivities between said first and second transducer channels by comparing said first and second outputs.

12. The method of claim 11, wherein said step of obtaining compensation for the differences in responsivities between said first and second transducer channels includes comparing the outputs of two transducer channels having adjacent transducers.

13. The method of claim 12, wherein said predetermined portion of said object space comprises a plurality of object space scan lines.

14. The method of claim 13, wherein said step of obtaining compensation for the differences in responsivities between said first and second transducer channels includes comparing the outputs of at least two of said transducer channels while said two transducer channels view the same object space scan line.

15. The method of claim 14, wherein said method further includes the additional step of obtaining D.C. restoration of the average signals received by said transducer channels by comparing the outputs of said transducer channels when viewing said object space.

16. The method of claim 15, wherein said step of obtaining D.C. restoration includes comparing the outputs of at least two of said transducer channels while said two transducer channels view the same object space scan line.

17. The method of claim 16, wherein said method includes the additional step of sequentially displacing the transducers of said transducer channels with respect to said object space to allow an overlapping scan of said object space.

18. The method of claim 17, wherein said step of sequentially displacing the transducers of said transducer channels is operable to scan said object space in an interlace pattern.

19. The method of claim 18, wherein said step of sequentially displacing the transducers of said transducer channels is operable to produce a 4:1 vertical interlace scanning pattern.

20. The method of claim 19, wherein said transducer channels detect infrared radiation.

* * * * *